(12) United States Patent
Chen et al.

(10) Patent No.: US 8,976,467 B2
(45) Date of Patent: Mar. 10, 2015

(54) MOBILE DEVICE AND OPTICAL IMAGING LENS THEREOF

(71) Applicant: Genius Electronic Optical Co., Ltd., Taichung (TW)

(72) Inventors: Shihhan Chen, Taichung (TW); Yanbin Chen, Xiamen (CN); Long Ye, Xiamen (CN)

(73) Assignee: Genius Electronic Optical Co., Ltd., Taichung (TW)

( * ) Notice: Subject to any disclaimer, the term of this patent is extended or adjusted under 35 U.S.C. 154(b) by 0 days.

(21) Appl. No.: 13/757,675

(22) Filed: Feb. 1, 2013

(65) Prior Publication Data

US 2014/0071340 A1 Mar. 13, 2014

(30) Foreign Application Priority Data

Sep. 7, 2012 (CN) .......................... 2012 1 0328571
Nov. 6, 2012 (CN) .......................... 2012 1 0437198

(51) Int. Cl.
*G02B 9/34* (2006.01)
*H04N 5/225* (2006.01)
(Continued)

(52) U.S. Cl.
CPC .............. *G02B 9/34* (2013.01); *H04N 5/2254* (2013.01); *G02B 13/004* (2013.01); *G02B 13/18* (2013.01); *G02B 3/00* (2013.01)
USPC .......................................... 359/772; 359/747

(58) Field of Classification Search
CPC .............. G02B 9/00; G02B 9/34; G02B 9/60; G02B 9/62
USPC ......... 359/713–715, 747, 754–758, 763, 764, 359/771, 772, 774
See application file for complete search history.

(56) References Cited

U.S. PATENT DOCUMENTS 2,170,428 A    8/1939    Richter
2,310,502 A    2/1943    Warmisham
(Continued)

FOREIGN PATENT DOCUMENTS

CN    2612961    4/2002
CN    201255784 Y    6/2009
(Continued)

OTHER PUBLICATIONS

Handbook of Plastic Optics, edited by Stefan Baumer, 2010, Wiley-VCH Verlag GmbH & Co., Germany, Chapter 9.6, pp. 264-265.
(Continued)

*Primary Examiner* — Darryl J Collins
(74) *Attorney, Agent, or Firm* — Kilpatrick Townsend & Stockton LLP

(57) ABSTRACT

The present invention provides a mobile device and an optical imaging lens thereof. The optical imaging lens comprises an aperture stop, first, second, third and fourth lens elements positioned sequentially from an object side to an image side. The first lens element with positive refracting power has a surface facing toward the object side. The second lens element with negative refracting power has a convex surface facing toward the object. The third lens element has a positive refracting power. The fourth lens element has a surface facing toward the object side with a concave portion in the vicinity of the optical axis and a surface facing toward the image side with a convex portion in the peripheral vicinity. The optical imaging lens of the present invention is capable of shortening the total length of the optical imaging lens efficiently and has good optical characteristics.

12 Claims, 21 Drawing Sheets

(51) Int. Cl.
*G02B 13/00* (2006.01)
*G02B 13/18* (2006.01)
*G02B 3/00* (2006.01)

(56) References Cited

U.S. PATENT DOCUMENTS

| | | | |
|---|---|---|---|
| 2,767,614 A | 10/1956 | Altman | |
| 3,649,104 A | 3/1972 | Edwards et al. | |
| 4,606,607 A | 8/1986 | Kurihara | |
| 5,274,456 A | 12/1993 | Izumi et al. | |
| 5,966,251 A | 10/1999 | Nagahara | |
| 6,043,941 A | 3/2000 | Yamada | |
| 6,108,146 A * | 8/2000 | Kenin et al. | 359/822 |
| 6,476,982 B1 | 11/2002 | Kawakami | |
| 6,728,047 B2 | 4/2004 | Sato | |
| 6,891,683 B2 | 5/2005 | Schuster | |
| 6,917,479 B2 | 7/2005 | Park | |
| 6,950,246 B2 | 9/2005 | Amanai | |
| 6,982,835 B2 | 1/2006 | Tomioka | |
| 6,985,306 B2 | 1/2006 | Abe | |
| 7,012,765 B2 | 3/2006 | Matsui | |
| 7,035,023 B2 | 4/2006 | Nanba | |
| 7,061,694 B2 | 6/2006 | Amanai | |
| 7,206,143 B2 | 4/2007 | Kamo et al. | |
| 7,215,492 B2 | 5/2007 | Sato et al. | |
| 7,274,518 B1 | 9/2007 | Tang | |
| 7,277,238 B2 | 10/2007 | Noda | |
| 7,295,386 B2 | 11/2007 | Taniyama | |
| 7,345,830 B2 | 3/2008 | Shinohara | |
| 7,365,920 B2 | 4/2008 | Noda | |
| 7,408,723 B1 | 8/2008 | Lin | |
| 7,453,654 B2 | 11/2008 | Shinohara | |
| 7,466,497 B2 * | 12/2008 | Park et al. | 359/715 |
| 7,535,658 B2 | 5/2009 | Taniyama | |
| 7,777,972 B1 | 8/2010 | Chen | |
| 7,826,151 B2 | 11/2010 | Tsai | |
| 7,864,454 B1 | 1/2011 | Tang | |
| 7,920,340 B2 | 4/2011 | Tang | |
| 7,957,079 B2 | 6/2011 | Tang | |
| 8,164,678 B2 | 4/2012 | Tsai | |
| 8,184,383 B2 | 5/2012 | Shinohara | |
| 8,233,224 B2 | 7/2012 | Chen | |
| 8,310,768 B2 | 11/2012 | Lin | |
| 8,395,691 B2 | 3/2013 | Tang | |
| 8,537,473 B2 | 9/2013 | Yin | |
| 2002/0181121 A1 | 12/2002 | Kawakami | |
| 2003/0184883 A1 | 10/2003 | Sato | |
| 2005/0030645 A1 | 2/2005 | Do | |
| 2006/0056068 A1 | 3/2006 | Lee | |
| 2006/0238898 A1 | 10/2006 | Shinohara | |
| 2007/0008625 A1 | 1/2007 | Park et al. | |
| 2007/0081259 A1 | 4/2007 | Noda | |
| 2007/0146901 A1 | 6/2007 | Noda | |
| 2007/0188891 A1 | 8/2007 | Shinohara | |
| 2008/0180817 A1 | 7/2008 | Taniyama | |
| 2011/0115962 A1 | 5/2011 | Chen | |
| 2012/0200945 A1 * | 8/2012 | Kubota et al. | 359/774 |
| 2012/0287514 A1 * | 11/2012 | Tang et al. | 359/715 |

FOREIGN PATENT DOCUMENTS

| | | |
|---|---|---|
| CN | 201392425 Y | 1/2010 |
| CN | 102411190 A | 4/2012 |
| JP | 2002-365529 | 12/2002 |
| JP | 2004302057 A | 10/2004 |
| JP | 2005-024889 | 1/2005 |
| JP | 2005004027 A | 1/2005 |
| JP | 2005004028 A | 1/2005 |
| JP | 2005024581 A | 1/2005 |
| JP | 2005-208236 | 4/2005 |
| JP | 2005164899 A | 6/2005 |
| JP | 2009169005 A | 7/2009 |
| JP | 2011090127 A | 5/2011 |
| JP | 2011112735 A | 6/2011 |
| KR | 10-2003-0054649 | 10/2005 |
| TW | I-279607 | 4/2007 |
| TW | M354079 U | 4/2009 |
| TW | M356127 U | 5/2009 |
| TW | M360369 U | 7/2009 |
| TW | 201122541 A | 7/2011 |
| TW | 201134062 A1 | 10/2011 |
| TW | 201144889 A | 12/2011 |
| TW | 201209472 A | 3/2012 |
| TW | 201215941 A | 4/2012 |
| TW | 201217852 A | 5/2012 |
| TW | 201224568 A | 6/2012 |

OTHER PUBLICATIONS

Sharma, K.D., "Four-element lens system of the Cooke Triplet family: designs," Applied Optics, Mar. 1, 1980, vol. 19, pp. 698-701.

* cited by examiner

| f(Focus)=2.28 mm, HFOV(Half angular field of view)= 35.3 deg. ||||||||
|---|---|---|---|---|---|---|---|
| Surface # | | Radius | Thickness | Refractive index | Abbe number | Material | Focus |
| - | Object | ∞ | | | | | |
| 100 | Aperture stop | ∞ | 0.000 | | | | |
| 111 | 1st lens element | 1.608 | 0.432 | 1.544 | 56.114 | plastic | 1.946 |
| 112 | | -2.834 | 0.065 | | | | |
| 121 | 2nd lens element | 4.759 | 0.277 | 1.632 | 23.279 | plastic | -3.161 |
| 122 | | 1.383 | 0.352 | | | | |
| 131 | 3rd lens element | -1.420 | 0.450 | 1.544 | 56.114 | plastic | 1.350 |
| 132 | | -0.540 | 0.062 | | | | |
| 141 | 4th lens element | 1.637 | 0.300 | 1.531 | 55.744 | plastic | -1.584 |
| 142 | | 0.522 | 0.400 | | | | |
| 151 | IR cut filter | ∞ | 0.300 | | | | |
| 152 | IR cut filter | ∞ | 0.395 | | | | |
| 160 | Image plane | ∞ | 0.000 | | | | |

FIG.4

| Aspherical parameters | | | | |
|---|---|---|---|---|
| Surface # | 111 | 112 | 121 | 122 |
| K | -2.3318E+01 | 1.8897E+01 | -6.4970E+00 | -5.9957E+00 |
| $a_4$ | 5.4299E-01 | -2.2015E-01 | -2.2874E-01 | 2.8336E-01 |
| $a_6$ | -2.1796E+00 | -1.5066E-01 | -1.5830E+00 | -1.3196E+00 |
| $a_8$ | 1.6707E+00 | 4.3087E-01 | 8.0969E+00 | 2.9325E+00 |
| $a_{10}$ | 7.0324E+00 | 5.7441E+00 | -7.5738E+00 | -9.8326E-01 |
| $a_{12}$ | -2.1805E+01 | -8.9404E+00 | -1.6870E+00 | -8.0479E-01 |
| Surface # | 131 | 132 | 141 | 142 |
| K | -2.3280E+00 | -3.5564E+00 | -1.0992E+01 | -5.5951E+00 |
| $a_4$ | 3.9330E-01 | -1.9372E-01 | -1.9641E-01 | -2.4082E-01 |
| $a_6$ | -2.0617E-01 | 1.8432E-01 | 8.9614E-02 | 1.7158E-01 |
| $a_8$ | 5.7099E-01 | 1.2733E+00 | 4.1807E-02 | -1.1106E-01 |
| $a_{10}$ | -1.8896E+00 | -1.5992E+00 | -3.5471E-02 | 4.3231E-02 |
| $a_{12}$ | 1.3016E+00 | 4.2788E-01 | 6.3432E-03 | -6.3060E-03 |

FIG.5

| f(Focus)=2.33mm,HFOV(Half angular field of view)=34.89 deg. ||||||||
|---|---|---|---|---|---|---|---|
| Surface # | | Radius | Thickness | Refractive index | Abbe number | Material | Focus |
| - | Object | ∞ | | | | | |
| 200 | Aperture stop | ∞ | 0.000 | | | | |
| 211 | 1st lens element | 1.640 | 0.339 | 1.544 | 56.114 | plastic | 1.939 |
| 212 | | -2.769 | 0.060 | | | | |
| 221 | 2nd lens element | 4.208 | 0.244 | 1.632 | 23.279 | plastic | -3.391 |
| 222 | | 1.395 | 0.494 | | | | |
| 231 | 3rd lens element | -1.217 | 0.350 | 1.535 | 55.635 | plastic | 1.557 |
| 232 | | -0.545 | 0.090 | | | | |
| 241 | 4th lens element | 1.598 | 0.300 | 1.531 | 55.744 | plastic | -1.784 |
| 242 | | 0.557 | 0.400 | | | | |
| 251 | IR cut filter | ∞ | 0.300 | | | | |
| 252 | IR cut filter | ∞ | 0.403 | | | | |
| 260 | Image plane | ∞ | 0.000 | | | | |

FIG.8

| Aspherical parameters | | | | |
|---|---|---|---|---|
| Surface # | 211 | 212 | 221 | 222 |
| K | -2.6646E+01 | 2.0719E-01 | -3.1740E+00 | -6.8827E-00 |
| $a_4$ | 5.1185E-01 | -2.3085E-01 | -2.0219E-01 | 2.5344E-01 |
| $a_6$ | -2.4733E+00 | -3.4800E-01 | -1.5844E+00 | -1.4031E-00 |
| $a_8$ | 1.0143E+00 | -2.9557E-01 | 7.9304E+00 | 2.9208E-00 |
| $a_{10}$ | 5.5069E+00 | 4.7091E-00 | -8.0038E+00 | -7.4564E-01 |
| $a_{12}$ | -2.0261E+01 | -9.0423E-01 | -9.9940E-01 | -2.0759E-00 |
| Surface # | 231 | 232 | 241 | 242 |
| K | -1.3280E+00 | -3.1918E-00 | -1.0006E+01 | -5.6067E-00 |
| $a_4$ | 3.7024E-01 | -1.4770E-01 | -2.0634E-01 | -2.4207E-01 |
| $a_6$ | -2.0171E-01 | 1.9341E-01 | 1.0050E-01 | 1.7149E-01 |
| $a_8$ | 5.7775E-01 | 1.2413E-00 | 4.4294E-02 | -1.0869E-01 |
| $a_{10}$ | -1.8977E+00 | -1.6200E-00 | -3.5035E-02 | 4.4935E-02 |
| $a_{12}$ | 8.2213E-01 | 4.8884E-01 | 4.8894E-03 | -7.3958E-03 |

FIG.9

| f(Focus)=2.53mm,HFOV(Half angular field of view)=32.48 deg. | | | | | | | |
|---|---|---|---|---|---|---|---|
| Surface # | | Radius | Thickness | Refractive index | Abbe number | Material | Focus |
| - | Object | ∞ | | | | | |
| 300 | Aperture stop | ∞ | 0.000 | | | | |
| 311 | 1st lens element | 1.622 | 0.287 | 1.544 | 56.114 | plastic | 1.938 |
| 312 | | -2.852 | 0.070 | | | | |
| 321 | 2nd lens element | 3.722 | 0.260 | 1.632 | 23.279 | plastic | -3.205 |
| 322 | | 1.283 | 0.458 | | | | |
| 331 | 3rd lens element | -1.611 | 0.552 | 1.544 | 56.114 | plastic | 1.520 |
| 332 | | -0.614 | 0.060 | | | | |
| 341 | 4th lens element | 1.879 | 0.300 | 1.531 | 55.744 | plastic | -1.794 |
| 342 | | 0.598 | 0.400 | | | | |
| 351 | IR cut filter | ∞ | 0.300 | | | | |
| 352 | IR cut filter | ∞ | 0.558 | | | | |
| 360 | Image plane | ∞ | 0.000 | | | | |

FIG.12

| Aspherical parameters | | | | |
|---|---|---|---|---|
| Surface # | 311 | 312 | 321 | 322 |
| K | -2.5340E+01 | 1.8292E+01 | 5.1230E+00 | -5.9228E+00 |
| $a_4$ | 4.7344E-01 | -1.4608E-01 | -1.4897E-01 | 2.7290E-01 |
| $a_6$ | -2.3547E+00 | -1.0753E+00 | -1.6081E+00 | -1.0842E+00 |
| $a_8$ | 6.6978E-01 | 7.6136E-01 | 7.3792E+00 | 2.7046E+00 |
| $a_{10}$ | 4.3973E+00 | 6.0364E+00 | -7.9255E+00 | -1.3673E+00 |
| $a_{12}$ | -2.4159E+01 | -2.0138E+01 | 1.4199E-01 | -1.5910E+00 |
| Surface # | 331 | 332 | 341 | 342 |
| K | -3.8000E-01 | -4.0354E+00 | -1.1149E+01 | -6.0934E+00 |
| $a_4$ | 3.6460E-01 | -6.5732E-02 | -1.3749E-01 | -2.2382E-01 |
| $a_6$ | -1.6633E-01 | 5.3810E-02 | 7.7153E-02 | 1.6650E-01 |
| $a_8$ | 6.9650E-01 | 1.1494E+00 | 2.3022E-02 | -1.0867E-01 |
| $a_{10}$ | -1.6397E+00 | -1.5835E+00 | -3.8855E-02 | 4.3009E-02 |
| $a_{12}$ | 1.0318E+00 | 6.3395E-01 | 9.0822E-03 | -8.6921E-03 |

FIG.13

| f(Focus)=2.50mm,HFOV(Half angular field of view)=32.66 deg. ||||||||
|---|---|---|---|---|---|---|---|
| Surface # | | Radius | Thickness | Refractive index | Abbe number | Material | Focus |
| - | Object | ∞ | | | | | |
| 400 | Aperture stop | ∞ | 0.000 | | | | |
| 411 | 1st lens element | 1.643 | 0.457 | 1.544 | 56.114 | plastic | 1.962 |
| 412 | | -2.777 | 0.070 | | | | |
| 421 | 2nd lens element | 3.849 | 0.260 | 1.632 | 23.279 | plastic | -3.399 |
| 422 | | 1.349 | 0.459 | | | | |
| 431 | 3rd lens element | -1.314 | 0.448 | 1.544 | 56.114 | plastic | 1.829 |
| 432 | | -0.636 | 0.060 | | | | |
| 441 | 4th lens element | 2.012 | 0.395 | 1.531 | 55.744 | plastic | -2.091 |
| 442 | | 0.668 | 0.400 | | | | |
| 451 | IR cut filter | ∞ | 0.300 | | | | |
| 452 | IR cut filter | ∞ | 0.400 | | | | |
| 460 | Image plane | ∞ | 0.000 | | | | |

FIG.16

| Aspherical parameters | | | | |
|---|---|---|---|---|
| Surface # | 411 | 412 | 421 | 422 |
| K | -2.4703E+01 | 1.4162E+01 | 6.5100E+00 | -5.9328E+00 |
| $a_4$ | 5.3475E-01 | -1.0117E-01 | -1.4220E-01 | 2.7964E-01 |
| $a_6$ | -2.0607E+00 | -7.1519E-01 | -1.6002E+00 | -1.1812E+00 |
| $a_8$ | 1.7395E+00 | 1.4068E+00 | 7.4575E+00 | 2.9803E+00 |
| $a_{10}$ | 6.5907E+00 | 6.3733E+00 | -8.3400E+00 | -1.4611E+00 |
| $a_{12}$ | -1.8955E+01 | -1.6187E-01 | -3.2783E-01 | -1.5753E+00 |
| Surface # | 431 | 432 | 441 | 442 |
| K | -1.4620E+00 | -3.3726E-00 | -1.1630E+01 | -6.1774E+00 |
| $a_4$ | 3.9657E-01 | -5.7535E-02 | -1.5285E-01 | -2.1548E-01 |
| $a_6$ | -3.0389E-01 | 7.6303E-02 | 8.0227E-02 | 1.6106E-01 |
| $a_8$ | 7.3686E-01 | 1.1056E+00 | 2.8262E-02 | -1.0892E-01 |
| $a_{10}$ | -1.5539E+00 | -1.6228E-00 | -3.7115E-02 | 4.5231E-02 |
| $a_{12}$ | 8.9915E-01 | 6.7038E-01 | 6.9965E-03 | -8.9424E-03 |

FIG.17

| f(Focus)=2.54mm,HFOV(Half angular field of view)=32.45 deg. | | | | | | | |
|---|---|---|---|---|---|---|---|
| Surface # | | Radius | Thickness | Refractive index | Abbe number | Material | Focus |
| - | Object | ∞ | | | | | |
| 500 | Aperture stop | ∞ | 0.000 | | | | |
| 511 | 1st lens element | 1.308 | 0.295 | 1.544 | 56.114 | plastic | 2.007 |
| 512 | | -6.211 | 0.060 | | | | |
| 521 | 2nd lens element | 3.575 | 0.238 | 1.632 | 23.279 | plastic | -3.518 |
| 522 | | 1.342 | 0.458 | | | | |
| 531 | 3rd lens element | -1.019 | 0.302 | 1.535 | 55.635 | plastic | 1.509 |
| 532 | | -0.498 | 0.071 | | | | |
| 541 | 4th lens element | 1.838 | 0.249 | 1.531 | 55.744 | plastic | -1.725 |
| 542 | | 0.584 | 0.400 | | | | |
| 551 | IR cut filter | ∞ | 0.300 | | | | |
| 552 | IR cut filter | ∞ | 0.651 | | | | |
| 560 | Image plane | ∞ | 0.000 | | | | |

FIG.20

| Aspherical parameters | | | | |
|---|---|---|---|---|
| Surface # | 511 | 512 | 521 | 522 |
| K | -1.5586E+01 | -3.1105E+02 | 2.0772E+01 | -2.4667E-01 |
| $a_4$ | 6.7302E-01 | -8.0028E-02 | 1.0786E-01 | 4.4900E-02 |
| $a_6$ | -1.7520E+00 | 8.1066E-01 | -1.9777E+00 | -1.5285E+00 |
| $a_8$ | 4.6841E-00 | -2.4014E+00 | 1.0698E+01 | 3.8773E+00 |
| $a_{10}$ | -1.6959E+01 | 1.7595E-01 | -8.4809E+00 | 3.0672E+00 |
| $a_{12}$ | 4.7763E-01 | -2.1207E+01 | -1.5776E+01 | -1.0318E+01 |
| $a_{14}$ | -1.8104E+01 | -2.4562E+01 | -5.4011E+00 | -2.3666E+00 |
| $a_{16}$ | -6.5670E+01 | -1.4067E+02 | -1.1368E+01 | -5.9429E+00 |
| Surface # | 531 | 532 | 541 | 542 |
| K | -9.7000E+00 | -3.8367E+00 | -6.9020E+00 | -8.6439E+00 |
| $a_4$ | 2.4648E-01 | 1.0102E-01 | -2.7934E-01 | -2.8176E-01 |
| $a_6$ | -1.4800E-01 | 3.1713E-01 | 1.3056E-01 | 1.8690E-01 |
| $a_8$ | 7.8415E-01 | 1.1418E-00 | 8.0372E-02 | -1.1156E-01 |
| $a_{10}$ | -1.8866E+00 | -1.9329E+00 | -3.9357E-02 | 4.6149E-02 |
| $a_{12}$ | -1.0040E+00 | 2.3147E-01 | -2.9502E-02 | -1.1766E-02 |
| $a_{14}$ | 6.5666E-01 | 4.4984E-02 | 4.0591E-03 | 7.8558E-04 |
| $a_{16}$ | 2.7063E-03 | 1.4261E-01 | 3.0889E-03 | -9.7453E-04 |

FIG.21

| f(Focus)=2.28mm,HFOV(Half angular field of view)=35.33 deg. ||||||||
|---|---|---|---|---|---|---|---|
| Surface # | | Radius | Thickness | Refractive index | Abbe number | Material | Focus |
| - | Object | ∞ | | | | | |
| 600 | Aperture stop | ∞ | 0.000 | | | | |
| 611 | 1st lens element | 1.468 | 0.393 | 1.544 | 56.114 | plastic | 1.852 |
| 612 | | -2.834 | 0.076 | | | | |
| 621 | 2nd lens element | 12.172 | 0.271 | 1.632 | 23.279 | plastic | -3.601 |
| 622 | | 1.913 | 0.286 | | | | |
| 631 | 3rd lens element | -1.162 | 0.383 | 1.544 | 56.114 | plastic | 1.682 |
| 632 | | -0.573 | 0.060 | | | | |
| 641 | 4th lens element | 4.191 | 0.409 | 1.531 | 55.744 | plastic | -1.849 |
| 642 | | 0.771 | 0.400 | | | | |
| 651 | IR cut filter | ∞ | 0.300 | | | | |
| 652 | IR cut filter | ∞ | 0.381 | | | | |
| 660 | Image plane | ∞ | 0.000 | | | | |

FIG.24

| Aspherical parameters | | | | |
|---|---|---|---|---|
| Surface # | 611 | 612 | 621 | 622 |
| K | -1.8509E+01 | 1.9500E+01 | 3.4535E+01 | -2.8030E+00 |
| $a_4$ | 5.1499E-01 | -3.4805E-01 | -2.1325E-01 | 2.6227E-01 |
| $a_6$ | -2.3402E+00 | -2.1740E-01 | -1.4872E+00 | -1.4063E+00 |
| $a_8$ | 1.3494E+00 | 2.7613E-01 | 8.2044E+00 | 3.1532E+00 |
| $a_{10}$ | 6.5645E+00 | 5.6202E+00 | -7.5371E+00 | -1.0937E+00 |
| $a_{12}$ | -2.7192E+01 | -9.1789E+00 | -1.8424E+00 | -1.3342E+00 |
| Surface # | 631 | 632 | 641 | 642 |
| K | -3.4540E+00 | -3.3330E+00 | -1.6384E+01 | -9.0320E+00 |
| $a_4$ | 4.1236E-01 | -1.8099E-01 | -2.9683E-01 | -2.6151E-01 |
| $a_6$ | -2.4194E-01 | 2.7464E-01 | 2.2058E-02 | 1.4532E-01 |
| $a_8$ | 5.1202E-01 | 1.4135E+00 | 1.8097E-02 | -1.1335E-01 |
| $a_{10}$ | -2.1260E+00 | -1.5162E+00 | -2.3408E-02 | 4.1081E-02 |
| $a_{12}$ | 1.1927E+00 | 2.9461E-01 | 4.0751E-02 | -9.2077E-03 |

FIG.25

| Embodiment | 1st Embodiment | 2nd Embodiment | 3rd Embodiment | 4th Embodiment | 5th Embodiment | 6th Embodiment |
|---|---|---|---|---|---|---|
| T1 (mm) | 0.432 | 0.339 | 0.287 | 0.457 | 0.295 | 0.393 |
| T2 (mm) | 0.277 | 0.244 | 0.260 | 0.260 | 0.238 | 0.271 |
| T3 (mm) | 0.450 | 0.350 | 0.552 | 0.448 | 0.302 | 0.383 |
| T4 (mm) | 0.300 | 0.300 | 0.300 | 0.395 | 0.249 | 0.409 |
| $G_{23}$ (mm) | 0.352 | 0.494 | 0.458 | 0.459 | 0.458 | 0.286 |
| $G_{34}$ (mm) | 0.062 | 0.090 | 0.060 | 0.060 | 0.071 | 0.060 |
| EFL (mm) | 2.280 | 2.330 | 2.230 | 2.500 | 2.545 | 2.284 |
| $G_{aa}$ (mm) | 0.479 | 0.644 | 0.588 | 0.589 | 0.589 | 0.422 |
| T1+T3 (mm) | 0.882 | 0.689 | 0.839 | 0.905 | 0.596 | 0.776 |
| ALT (mm) | 1.459 | 1.233 | 1.399 | 1.560 | 1.083 | 1.456 |
| $T3/G_{34}$ | 7.260 | 3.889 | 9.200 | 7.469 | 4.229 | 6.383 |
| T4/T2 | 1.082 | 1.229 | 1.154 | 1.520 | 1.047 | 1.509 |
| $G_{23}/T4$ | 1.173 | 1.647 | 1.528 | 1.161 | 1.838 | 0.699 |
| $G_{aa}/ALT$ | 0.329 | 0.523 | 0.421 | 0.377 | 0.544 | 0.290 |
| (T1+T3)/T4 | 2.939 | 2.295 | 2.796 | 2.290 | 2.395 | 1.897 |
| EFL/ALT | 1.563 | 1.890 | 1.594 | 1.602 | 2.350 | 1.568 |
| Fno | 2.536 | 2.591 | 2.811 | 2.790 | 3.029 | 2.537 |

FIG.26

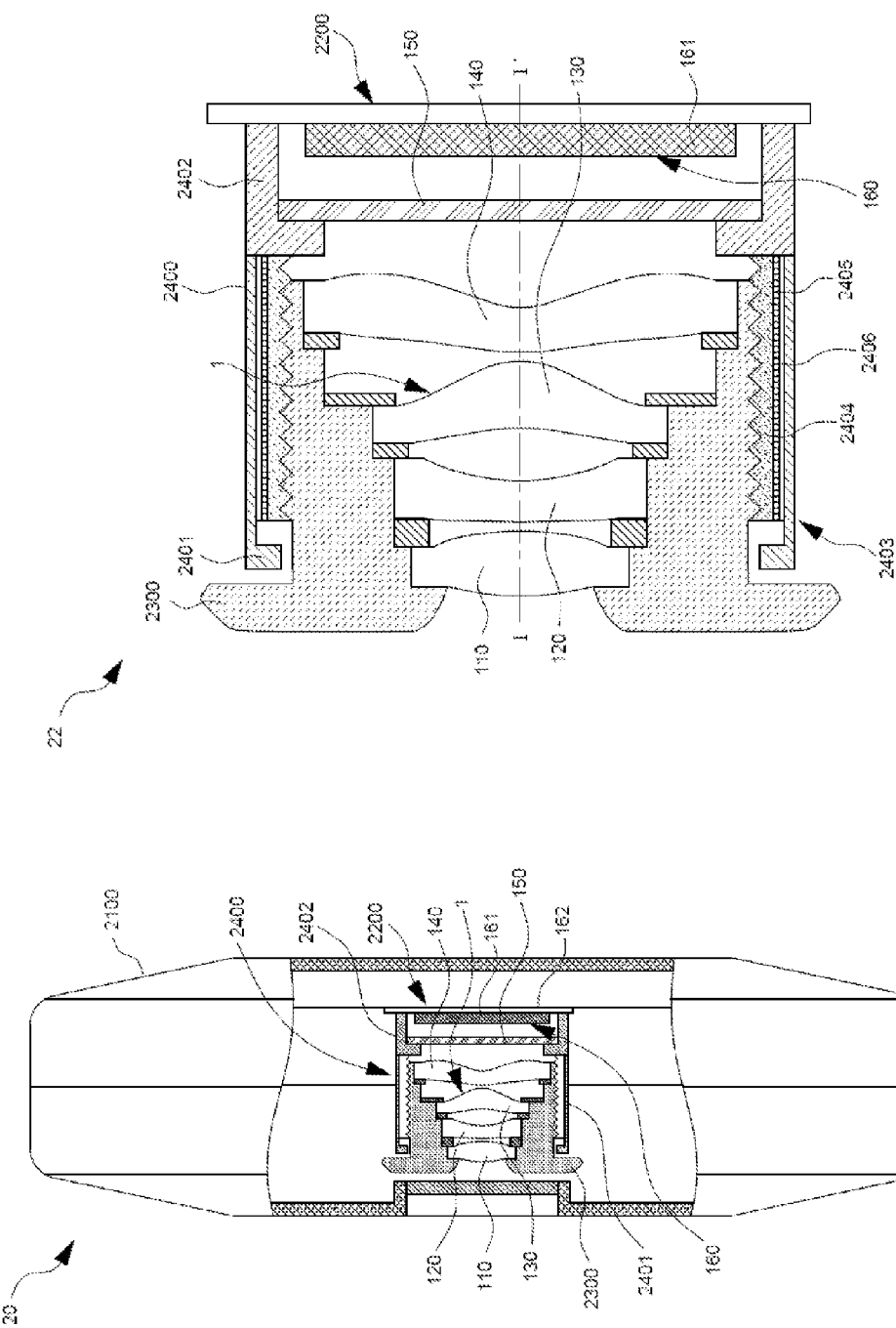

MOBILE DEVICE AND OPTICAL IMAGING LENS THEREOF

CROSS-REFERENCES TO RELATED APPLICATIONS

This application claims priority to Chinese Patent Application No. 201210328571.9, filed on Sep. 9, 2012 and Chinese Patent Application No. 201210437198.0, filed on Nov. 6, 2012, the contents of which are hereby incorporated by reference in their entirety for all purposes.

BACKGROUND OF THE INVENTION

The present invention relates to a mobile device and an optical imaging lens thereof, and particularly, relates to a mobile device applying an optical imaging lens having four lens elements and an optical imaging lens thereof.

The ever-increasing demand for smaller sized mobile devices, such as cell phones, digital cameras, etc. has correspondingly triggered a growing need for smaller sized photography modules contained therein. Size reductions may be contributed from various aspects of the mobile devices, which includes not only the charge coupled device (CCD) and the complementary metal-oxide semiconductor (CMOS), but also the optical imaging lens mounted therein. When reducing the size of the optical imaging lens, however, achieving good optical characteristics becomes a challenging problem.

U.S. Pat. No. 7,453,654, U.S. Pat. No. 8,184,383, R.O.C. Patent No. M356127, R.O.C. Patent Publication No. 201224568, R.O.C. Patent Publication No. 201217852, and R.O.C. Patent Publication No. 201215941 all disclosed an optical imaging lens constructed with an optical imaging lens having four lens elements. The thickness of the second image lens therein is thicker.

Japan Patent Publication No. 2011-090127, Japan Patent Publication No. 2009-169005, U.S. Pat. No. 7,777,972, U.S. Pat. No. 7,920,340, U.S. Pat. No. 7,277,238, U.S. Pat. No. 7,957,079, and U.S. Patent Publication No. 20110115962 all disclosed an optical imaging lens constructed with an optical imaging lens having four lens elements. The excessive sum of all air gaps between the lens elements is unfavorable for endeavoring slimmer mobile devices, such as cell phones and digital cameras.

Especially, in the third embodiment of U.S. Pat. No. 7,920,340, the length of the optical imaging lens is over 7 mm, which is not beneficial for the slimmer and smaller design of mobile devices.

How to effectively shorten the length of the optical imaging lens is one of the most important topics in the industry to pursue the trend of smaller and smaller mobile devices. Therefore, there is needed to develop optical imaging lens with a shorter length, while also having good optical characteristics.

BRIEF SUMMARY OF THE INVENTION

An object of the present invention is to provide a mobile device and an optical imaging lens thereof. By controlling the convex or concave shape of the surfaces of the lens elements, the length of the optical imaging lens can be shortened while maintaining good optical characteristics, such as high resolution.

In an exemplary embodiment, an optical imaging lens comprises, sequentially from an object side to an image side, an aperture stop, first, second, third and fourth lens elements, each of the first, second, third, and fourth lens elements having an object-side surface facing toward the object side and an image-side surface facing toward the image side. The first lens element has positive refracting power, and the object-side surface thereof has a convex portion in a vicinity of the optical axis. The second lens element has a negative refracting power and a convex object-side surface, and the image-side surface of the second lens element has a concave portion in a vicinity of the optical axis. The third lens element has a positive refracting power. The object-side surface of said fourth lens element comprises a convex portion in a vicinity of the optical axis, and the image-side surface of the fourth lens element comprises a concave portion in a vicinity of the optical axis and a convex portion in a vicinity of a periphery of the fourth lens element. The lens comprising the four lens elements has a refracting power as a whole.

In another exemplary embodiment, parameters of the les elements, such as a central thickness of the first lens element along the optical axis, T1, a central thickness of the second lens element along the optical axis, T2, a central thickness of the third lens element along the optical axis, T3, a central thickness of the fourth lens element along the optical axis, T4, an air gap between the second lens element and the third lens element along the optical axis, $G_{23}$, an air gap between the third lens element and the fourth lens element along the optical axis, $G_{34}$, the sum of all three air gaps from the first lens element to the fourth lens element along the optical axis, $G_{aa}$, an effective focal length, EFL, of the optical imaging lens, and the total thickness of all four lens elements, ALT, satisfying at least one of the equations:

$$(T3/G_{34}) \leq 10 \quad \text{Equation (1);}$$

$$(T4/T2) \leq 2 \quad \text{Equation (2);}$$

$$(G_{23}/T4) \leq 2 \quad \text{Equation (3);}$$

$$0.26 \leq (G_{aa}/\text{ALT}) \leq 0.65 \quad \text{Equation (4);}$$

$$1.8 \leq [(T1+T3)/T4] \leq 3 \quad \text{Equation (5); and/or}$$

$$(\text{EFL}/\text{ALT}) > 1.5 \quad \text{Equation (6).}$$

Aforesaid exemplary embodiments are not limited and could be selectively incorporated in other embodiments described herein.

In some exemplary embodiments, more details about the convex or concave surface structure and/or the refracting power could be incorporated for one specific lens element or broadly for plural lens elements to enhance the control for the system performance and/or resolution.

In another exemplary embodiment, a mobile device comprises a housing and an optical imaging lens assembly positioned in the housing. The optical imaging lens assembly comprises a lens barrel, any of aforesaid example embodiments of optical imaging lens, a module housing unit, and an image sensor. The lens comprising four lens elements with refracting power as a whole is positioned in the lens barrel, the module housing unit is for positioning the lens barrel, and the image sensor is positioned at the image-side of the optical imaging lens.

In some exemplary embodiments, the module housing unit optionally comprises an auto focus module and/or an image sensor base. The auto focus module may comprise a lens seat and a lens backseat, wherein the lens seat is positioned close to the outside of the lens barrel along with an axis; the lens backseat is positioned along the axis and around the outside of the lens seat; and the lens barrel and the optical imaging lens positioned therein are driven by the lens seat for moving along the axis to control the focusing of the optical imaging lens.

The image sensor base could be positioned between the lens backseat and the image sensor, and close to the lens backseat.

Through a ratio control among at least one central thickness of lens element along the optical axis, an air gap between two adjacent lens elements along the optical axis, and the sum of all air gaps between the four lens elements along the optical axis in a predetermined range, and together with the arrangement of the convex or concave shape of the surfaces of the lens element(s) and/or refracting power, the mobile device and the optical imaging lens thereof in exemplary embodiments can achieve good optical performance and effectively shorten the length of the optical imaging lens.

BRIEF DESCRIPTION OF THE DRAWINGS

Exemplary embodiments will be more readily understood from the following detailed description when read in conjunction with the appended drawing, in which:

FIG. 4 is a table of optical data for each lens element of a first embodiment of an optical imaging lens according to the present disclosure;

FIG. 5 is a table of aspherical data of a first embodiment of the optical imaging lens according to the present disclosure;

FIG. 8 is a table of optical data for each lens element of the optical imaging lens of a second embodiment of the present disclosure;

FIG. 9 is a table of aspherical data of a second embodiment of the optical imaging lens according to the present disclosure;

FIG. 12 is a table of optical data for each lens element of the optical imaging lens of a third embodiment of the present disclosure;

FIG. 13 is a table of aspherical data of a third embodiment of the optical imaging lens according to the present disclosure;

FIG. 16 is a table of optical data for each lens element of the optical imaging lens of a fourth embodiment of the present disclosure;

FIG. 17 is a table of aspherical data of a fourth embodiment of the optical imaging lens according to the present disclosure;

FIG. 20 is a table of optical data for each lens element of the optical imaging lens of a fifth embodiment of the present disclosure;

FIG. 21 is a table of aspherical data of a fifth embodiment of the optical imaging lens according to the present disclosure;

FIG. 24 is a table of optical data for each lens element of the optical imaging lens of a sixth embodiment of the present disclosure;

FIG. 25 is a table of aspherical data of a sixth embodiment of the optical imaging lens according to the present disclosure;

FIG. 26 is a table for the values of $(T3/G_{34})$, $(T4/T2)$, $(G_{23}/T4)$, $(G_{aa}/ALT)$, $[(T1+T3)/T4]$ and $(EFL/ALT)$ of all six example embodiments;

FIG. 27 is a structure of an example embodiment of a mobile device; and

FIG. 28 is a partially enlarged view of the structure of another example embodiment of a mobile device.

DETAILED DESCRIPTION OF THE INVENTION

Figure 1:
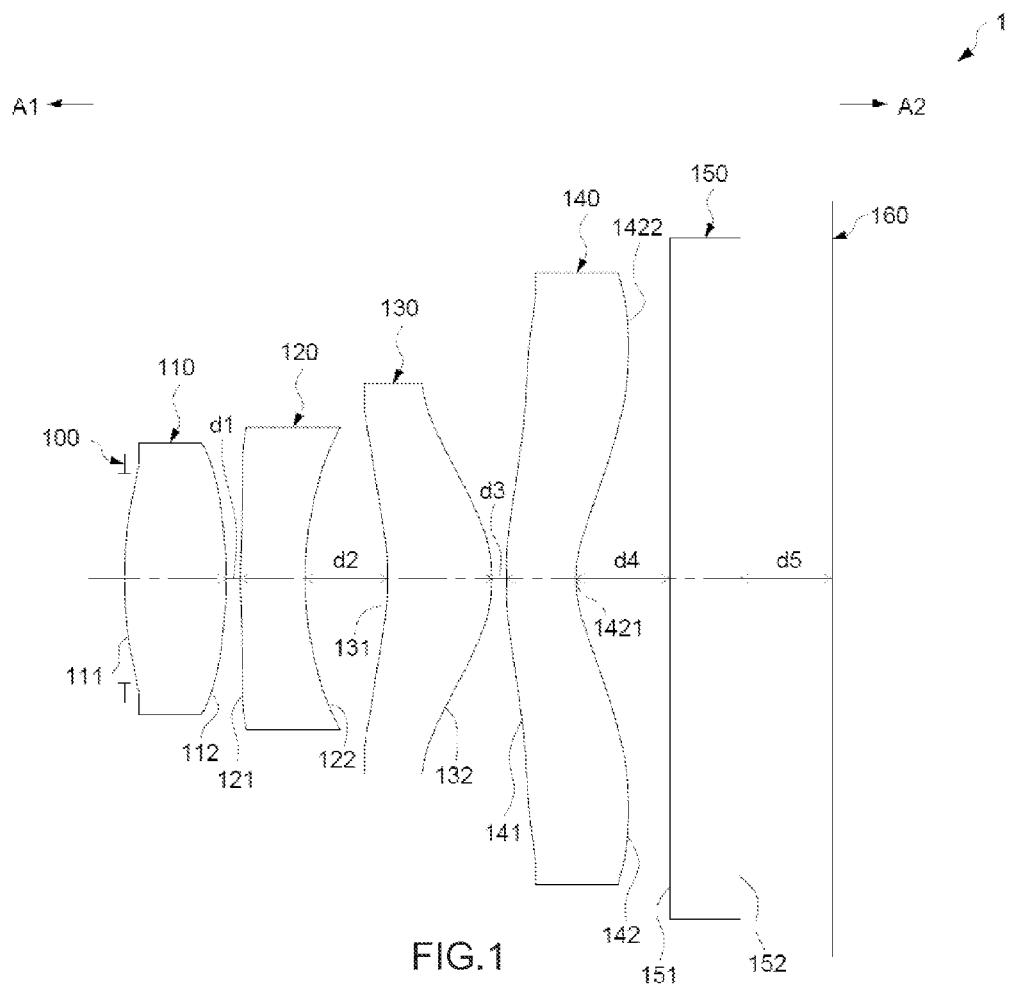
FIG. 1 is a cross-sectional view of a first embodiment of an optical imaging lens having four lens elements according to the present disclosure.

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosure and the appended claims, the terms "example embodiment," "exemplary embodiment," and "present embodiment" do not necessarily refer to a single embodiment, although it may, and various example embodiments may be readily combined and interchanged, without departing from the scope or spirit of the present invention. Furthermore, the terminology as used herein is for the purpose of describing example embodiments only and is not intended to be a limitation of the invention. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

Example embodiments of an optical imaging lens may comprise a first lens element, a second lens element, a third lens element, and a fourth lens element, each of the lens elements has an object-side surface facing toward the object side and an image-side surface facing toward the image side. These lens elements may be arranged sequentially from an object side to an image side, and example embodiments of the lens as a whole may comprise the four lens elements having positive or negative refracting power. In an example embodiment, the first lens element has positive refracting power, and the object-side surface thereof comprises a convex portion in a vicinity of the optical axis; the second lens element has negative refracting power and a convex object-side surface, and the image-side surface thereof comprises a concave portion in a vicinity of the optical axis; the third lens element has positive refracting power; and the object-side surface of the fourth lens element comprises a convex portion in a vicinity of the optical axis, and the image-side surface of the fourth lens element comprises a concave portion in a vicinity of the optical axis and a convex portion in a vicinity of a periphery of the fourth lens element.

Preferably, the first lens element having positive refracting power has the ability to converging light. The second lens element having negative refracting power can eliminate the aberration of the optical lens. The third lens element having positive refracting power is able to share a portion of the positive refracting power of the first lens element, which effectively reduces sensitivity of the optical lens and inaccuracy of the manufacturing process The fourth lens element adjusts the curvature, reduces the high level aberration, and depresses the angle of the chief ray (the incident angle of the light onto the image sensor), and then the sensitivity of the whole system is improved to achieve good optical characteristics.

In another exemplary embodiment, a central thickness of the third lens element along the optical axis, T3, and an air gap between the third lens element and the fourth lens element along the optical axis, $G_{34}$, satisfy the following equation:

$$(T3/G_{34}) \leq 10 \qquad \text{Equation (1)}.$$

Reference is now made to equation (1). A person having ordinary skill in the art would readily understand that when assuming that the air gap between the third lens element and the fourth lens element along the optical axis, $G_{34}$, is fixed and the central thickness of the third lens element along the optical axis, T3, is shortened to satisfy equation (1), the third lens element would have a proper refracting power and the optical imaging lens would have a shortened length. Considering a reasonable air gap, equation (1) may be further restricted by a lower limit, for example but not limited to, $4 \leq (T3/G_{34}) \leq 10$. The length of the optical imaging lens is shortened and the optical characteristic is also quite well in the range of $0 < (T3/G_{34}) < 4$. However, because the air gap between the third lens element and the fourth lens element along the optical axis should be smaller than other air gaps for the object-side surface of the fourth lens element comprising a convex portion in a vicinity of the optical axis, the greater $G_{34}$ in the range of $0 < (T3/G_{34}) < 4$ means that the total air gaps in the optical imaging lens is longer, and this makes the length of the optical imaging lens longer.

In another exemplary embodiment, a central thickness of the second lens element along the optical axis, T2, and a central thickness of the fourth lens element along the optical axis, T4, satisfy the following equation:

$$(T4/T2) \leq 2 \qquad \text{Equation (2)}.$$

Reference is now made to equation (2). A person having ordinary skill in the art would readily understand that when the central thickness T4 of the fourth lens element is shortened to satisfy equation (2), assuming the central thickness T2 of the second lens element is not changed, T4 would not be large. Considering a reasonable optical imaging lens length, equation (2) may be further restricted by a lower limit, for example but not limited to, $1 \leq (T4/T2) \leq 2$.

In some example embodiments, an air gap between the second lens element and the third lens element along the optical axis, $G_{23}$, and the central thickness T4 of the fourth lens element satisfy the following equation:

$$(G_{23}/T4) \leq 2 \qquad \text{Equation (3)}.$$

Reference is now made to equation (3). A person having ordinary skill in the art would readily understand that when the air gap between the second lens element and the third lens element along the optical axis, $G_{23}$, is shortened to satisfy equation (3), assuming the central thickness T4 of the fourth lens element along the optical axis is not changed, the length of the optical imaging lens can be shortened. Since the effective aperture of the fourth lens element is the largest in the optical imaging lens, the thickness of the fourth lens element T4 should not be too thin, or the thin fourth lens element would be fragile or broken during the production process.

In another exemplary embodiment, the sum of all three air gaps from the first lens element to the fourth lens element along the optical axis, $G_a$, and the total thickness of all four lens elements, ALT, satisfy the following equation:

$$0.26 \leq (G_{aa}/ALT) \leq 0.65 \qquad \text{Equation (4)}.$$

Reference is now made to equation (4). A person having ordinary skill in the art would readily understand that when the sum of all three air gaps $G_{aa}$ from the first lens element to the fourth lens element along the optical axis is shortened to satisfy equation (4), assuming the total thickness ALT of all four lens elements is not changed, the length of the optical imaging lens can be shortened.

In another exemplary embodiment, a central thickness of the first lens element along the optical axis, T1, the central thickness T3 of the third lens element along the optical axis, and the central thickness T4 of the fourth lens element along the optical axis satisfy the following equation:

$$1.8 \leq [(T1+T3)/T4] \leq 3 \qquad \text{Equation (5)}.$$

Reference is now made to equation (5). A person having ordinary skill in the art would readily understand when the central thickness T1 of the first lens element along the optical axis, and/or the central thickness T3 of the third lens element along the optical axis are shortened to satisfy equation (5), assuming the central thickness T4 of the fourth lens element along the optical axis is not changed, the length of the optical imaging lens can be shortened. Preferably, the thickness of the first, third, and fourth lens elements should satisfy equation (5), since the thickness of the first and third lens elements having positive refracting power are thicker and so is the fourth lens element for its greater effective aperture limiting the thickness thereof.

In another exemplary embodiment, an effective focal length, EFL, of the optical imaging lens, and the total thickness of all four lens elements, ALT, satisfy the following equation:

$$(EFL/ALT) > 1.5 \qquad \text{Equation (6)}.$$

Reference is now made to equation (6). A person having ordinary skill in the art would readily understand when the total thickness of all four lens elements, ALT, is shortened to satisfy equation (6), assuming the effective focal length, EFL, of the optical imaging lens is not changed, the length of the optical imaging lens can be shortened. Considering a reasonable optical imaging lens length, equation (6) may be further restricted by an upper limit, for example but not limited to, 1.5<(EFL/ALT)≤2.3. The length of the optical imaging lens is shortened and the optical characteristic is also quite well in the range of (EFL/ALT)>2.3; however, because the sum of the central thickness of the first, second, third, and fourth lens elements is small in this range, the production of such an imaging lens may be difficulty.

When implementing example embodiments, more details about the convex or concave surface structure and/or the refracting power may be incorporated for one specific lens element or broadly for plural lens elements to enhance the control for the system performance and/or resolution, as illustrated in the following embodiments. It is noted that the details listed here could be incorporated in example embodiments if no inconsistency occurs.

Figure 2:
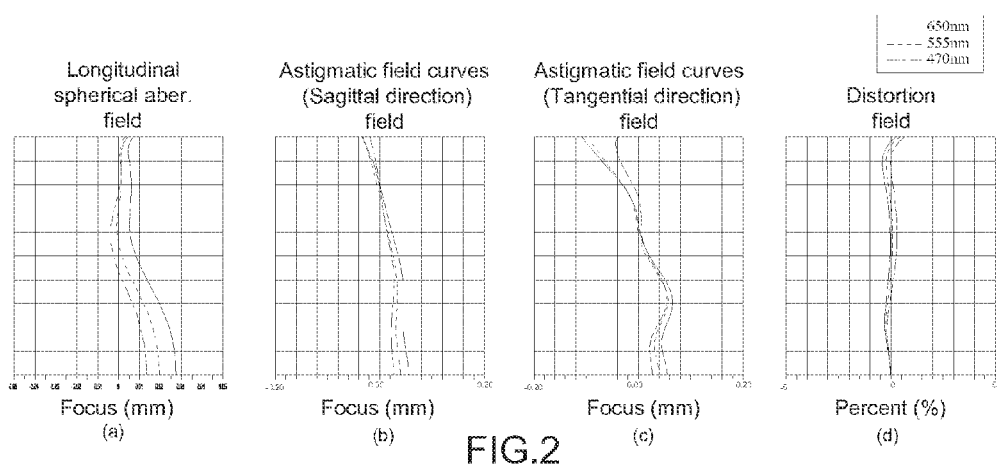
FIG. 2 is a chart of longitudinal spherical aberration and other kinds of optical aberrations of a first embodiment of the optical imaging lens according to the present disclosure.
Figure 3:
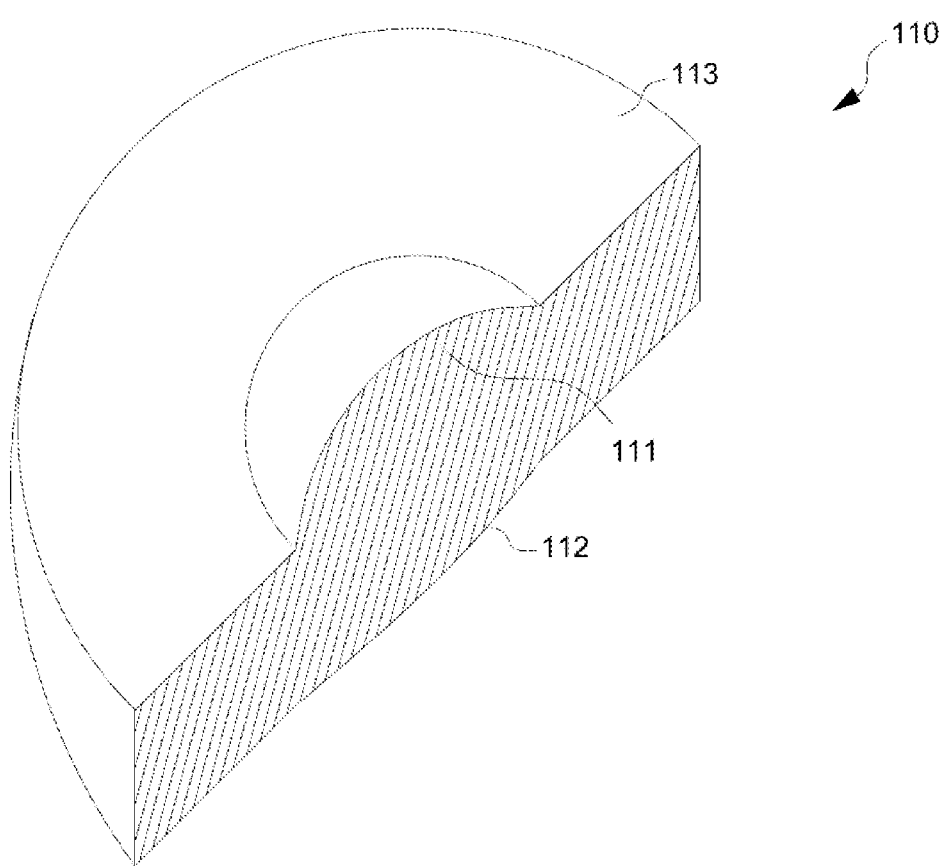
FIG. 3 is a cross-sectional view of a lens element of the optical imaging lens of an example embodiment of the present disclosure.

Several exemplary embodiments and associated optical data will now be provided for illustrating example embodiments of optical imaging lens with good optical characteristics and a shortened length. Reference is now made to FIGS. 1-5. FIG. 1 illustrates an example cross-sectional view of an optical imaging lens 1 having four lens elements of the optical imaging lens according to a first example embodiment. FIG. 2 shows example charts of longitudinal spherical aberration and other kinds of optical aberrations of the optical imaging lens 1 according to an example embodiment. FIG. 3 depicts another example cross-sectional view of a lens element of the optical imaging lens 1 according to an example embodiment. FIG. 4 illustrates an example table of optical data of each lens element of the optical imaging lens 1 according to an example embodiment. FIG. 5 depicts an example table of aspherical data of the optical imaging lens 1 according to an example embodiment.

As shown in FIG. 1, the optical imaging lens 1 of the present embodiment comprises, in order from an object side A1 to an image side A2, an aperture stop 100, a first lens element 110, a second lens element 120, a third lens element 130, and a fourth lens element 140, a filtering unit 150, and an image plane 160 of an image sensor. Each of the first, second, third, and fourth lens elements 110, 120, 130, 140 have a respective object-side surface 111, 121, 131, 141 facing toward the object side A1 and a respective image-side surface 112, 122, 132, 142 facing toward the image side A2. The aperture stop 100, positioned in front of the first lens element 110, and together with the first lens element 110 has positive refracting power, and both the object-side surface 111 facing toward the object side and the image-side convex surface 112 thereof are convex, and these two features could effectively shorten the length of the optical imaging lens 1. The example embodiment of the filtering unit 150 illustrated is an IR cut filter (infrared cut filter) positioned between the fourth lens element 140 and an image plane 160. The filtering unit 150, having an object-side surface 151 and an image-side surface 152, filters light with specific wavelength from the light passing optical imaging lens 1. For example, IR light is filtered, and this will prohibit the IR light which is invisible to the human eye from producing an image on the image plane 160.

Exemplary embodiments of each lens elements of the optical imaging lens 1 will now be described with reference to the drawings.

An example embodiment of the first lens element 110 may have positive refracting power, which may be constructed by a plastic material. The object-side surface 111 comprising a convex portion (not labeled) in a vicinity of the optical axis and the image-side surface 112 are both convex and may both be aspherical surfaces.

The second lens element 120 may have negative refracting power, which may be constructed by a plastic material. The object-side surface 121 is convex and the image-side surface 122 is concave. The image-side surface 122 comprises a concave portion (not labeled) in a vicinity of the optical axis. The convex surface 121 and concave surface 122 may both be aspherical surfaces.

The third lens element 130 may have positive refracting power, which may be constructed by a plastic material. The object-side surface 131 is concave and the image-side surface 132 is convex. The concave surface 131 and the convex surface 132 may both be aspherical surfaces.

The fourth lens element 140 may have negative refracting power, which may be constructed by a plastic material. The object-side surface 141 comprising a convex portion (not labeled) in a vicinity of the optical axis is convex. The image-side surface 142 has a concave portion 1421 in a vicinity of the optical axis and a convex portion 1422 in a vicinity of a periphery of the fourth lens element 140. The convex surface 141 and image-side surface 142 may both be aspherical surfaces.

In some example embodiments, air gaps exist between the lens elements, the filtering unit 150, and the image plane 160 of the image sensor. For example, FIG. 1 illustrates an air gap d1 between the first lens element 110 and the second lens element 120, an air gap d2 between the second lens element 120 and the third lens element 130, an air gap d3 between the third lens element 130 and the fourth lens element 140, an air gap d4 between the fourth lens element 140 and the filtering unit 150, and an air gap d5 between the filtering unit 150 and the image plane 160 of the image sensor. However, in other embodiments, any of the aforesaid air gaps may or may not exist. For example, the profiles of opposite surfaces of any two adjacent lens elements may correspond to each other, and in such situation, the air gaps may not exist. The air gap d1 is denoted by $G_{12}$, the air gap d3 is denoted by $G_{34}$, and the sum of all air gaps d1, d2, d3 between the first and fourth lens elements is denoted by $G_{aa}$.

FIG. 4 depicts the optical characteristics of each lens elements in the optical imaging lens 1 of the present embodiment, wherein the values of the equations (1)~(6) are:

$(T3/G_{34})=7.260;$ $(T4/T2)=1.082;$ $(G_{23}/T4)=1.173;$ $(G_{aa}/ALT)=0.329;$ $[(T1+T3)/T4]=2.939;$ $(EFL/ALT)=1.563;$ wherein the distance from the object-side convex surface 111 of the first lens element 110 to the image plane 160 is 3.03 mm, and the length of the optical imaging lens 1 is shortened.

Please note that, in example embodiments, to clearly illustrate the structure of each lens element, only the portion of the lens element which light passes through, is shown. For example, taking the first lens element 110 as an example, FIG. 1 illustrates the object-side convex surface 111 and the image-side convex surface 112. However, when implementing each lens element of the present embodiment, a fixing portion for positioning the lens elements inside the optical imaging lens 1 may be formed selectively. Based on the first lens element 110, please refer to FIG. 3, which illustrates the first lens element 110 further comprising a fixing portion. Here the fixing portion is not limited to an edge portion 113 extending from the object-side convex surface 111 and the image-side convex surface 112 to the edge of the first lens element 110 for mounting the first lens element 110 in the optical imaging lens 1, and ideally, light for imaging will not pass through the edge portion 113.

The aspherical surfaces, including the convex surface 111 and the convex surface 112 of the first lens element 110, the convex surface 121 and the concave surface 122 of the second lens element 120, the concave surface 131 and the convex surface 132 of the third lens element 130, and the convex surface 141 and the surface 142 of the fourth lens element 140 are all defined by the following aspherical formula:

$$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i}$$

wherein,

R represents the radius of the surface of the lens element;

Z represents the depth of the aspherical surface (the perpendicular distance between the point of the aspherical surface at a distance Y from the optical axis and the tangent plane of the vertex on the optical axis of the aspherical surface);

Y represents the perpendicular distance between the point of the aspherical surface and the optical axis;

K represents a conic constant;

$a_{2i}$ represents an aspherical coefficient of $2i^{th}$ level;

and the values of each aspherical parameter, K, and $a_4$~$a_{12}$ of each lens element 110, 120, 130, 140 are presented in FIG. 5.

As illustrated in FIG. 2, the optical imaging lens 1 of the present example embodiment shows great characteristics in the longitudinal spherical aberration (a), astigmatism aberration in the sagittal direction (b), astigmatism aberration in the tangential direction (c), and distortion aberration (d). Therefore, according to above described characteristics, the optical imaging lens 1 of the example embodiment indeed achieves great optical performance and the length of the optical imaging lens 1 is effectively shortened.

Figure 6:
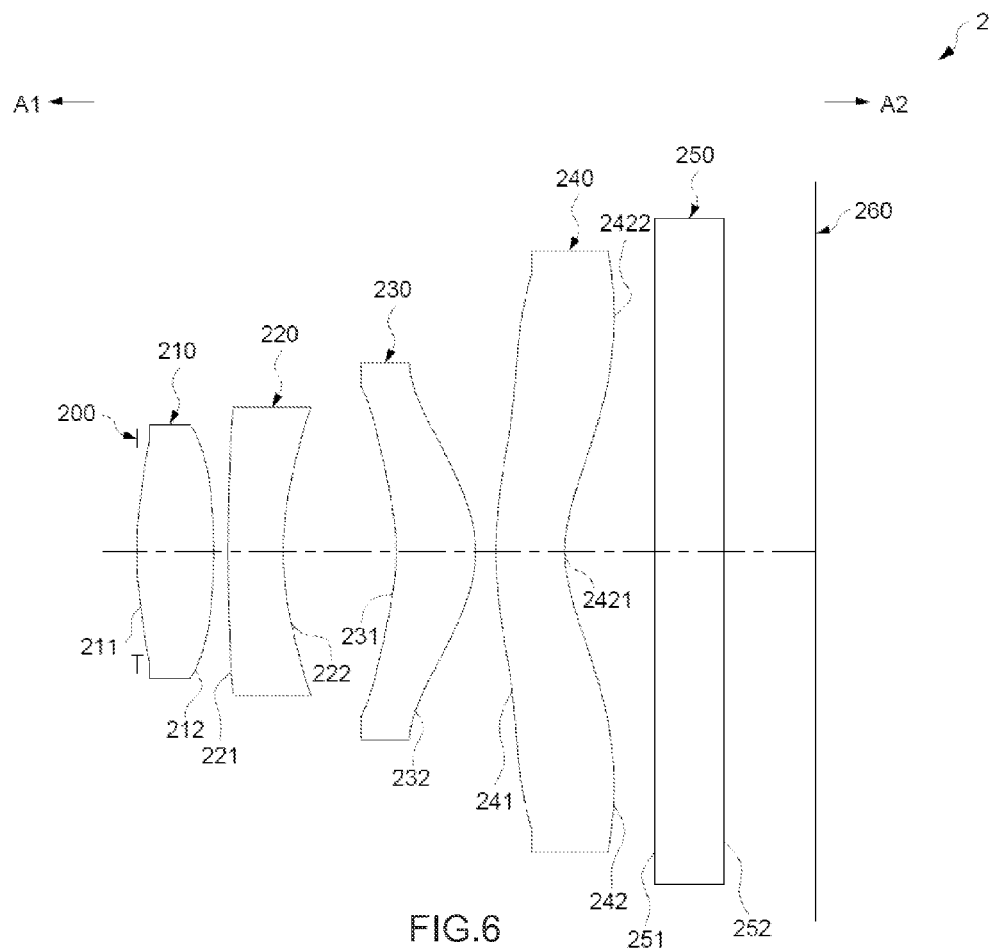
FIG. 6 is a cross-sectional view of a second embodiment of an optical imaging lens having four lens elements according to the present disclosure.
Figure 7:
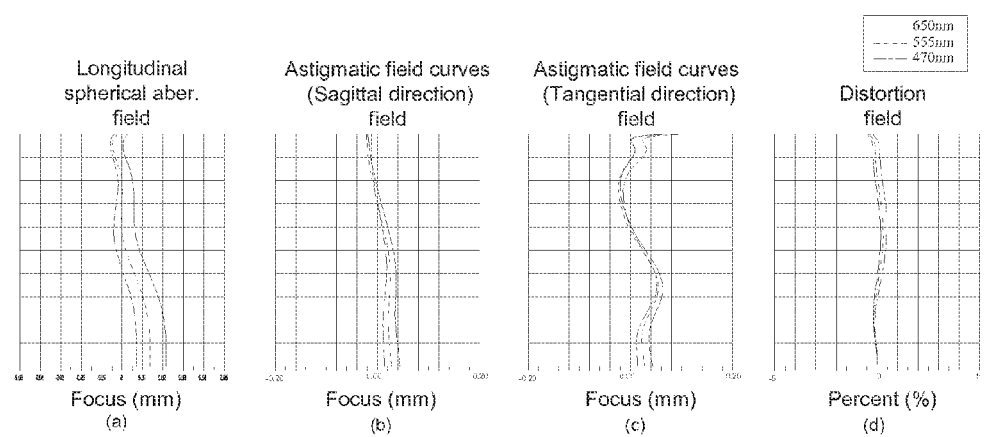
FIG. 7 is a chart of longitudinal spherical aberration and other kinds of optical aberrations of a second embodiment of the optical imaging lens according to the present disclosure.

Reference is now made to FIGS. 6-9. FIG. 6 illustrates an example cross-sectional view of an optical imaging lens 2 having four lens elements of the optical imaging lens according to a second example embodiment. FIG. 7 shows example charts of longitudinal spherical aberration and other kinds of optical aberrations of the optical imaging lens 2 according to an example embodiment. FIG. 8. shows an example table of optical data of each lens element of the optical imaging lens 2 according to the second example embodiment. FIG. 9 shows an example table of aspherical data of the optical imaging lens 2 according to the second example embodiment.

As shown in FIG. 6, the optical imaging lens 2 of the present embodiment, in an order from an object side A1 to an image side A2, comprises an aperture stop 200 positioned in front of a first lens element 210, a second lens element 220, a third lens element 230, and a fourth lens element 240. Each of the first, second, third, and fourth lens elements 210, 220, 230, 240 has a respective object-side surface 211, 221, 231, 241 facing toward the object side A1 and an image-side surface 212, 222, 232, 242 facing toward the image side A2. The second embodiment is similar to the first embodiment. Please refer to FIG. 8 for the optical characteristics of each lens elements in the optical imaging lens 2 of the present embodiment, wherein the values of the equations (1)~(6) are:

$(T3/G_{34})$=3.889;

$(T4/T2)$=1.229;

$(G_{23}/T4)$=1.647;

$(G_{aa}/ALT)$=0.523;

$[(T1+T3)/T4]$=2.295;

$(EFL/ALT)$=1.890;

wherein the distance from the object side of the first lens element 210 to the image plane 260 is 2.98 mm and the length of the optical imaging lens 2 is shortened.

As shown in FIG. 7, the optical imaging lens 2 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 2 is effectively shortened.

Figure 10:
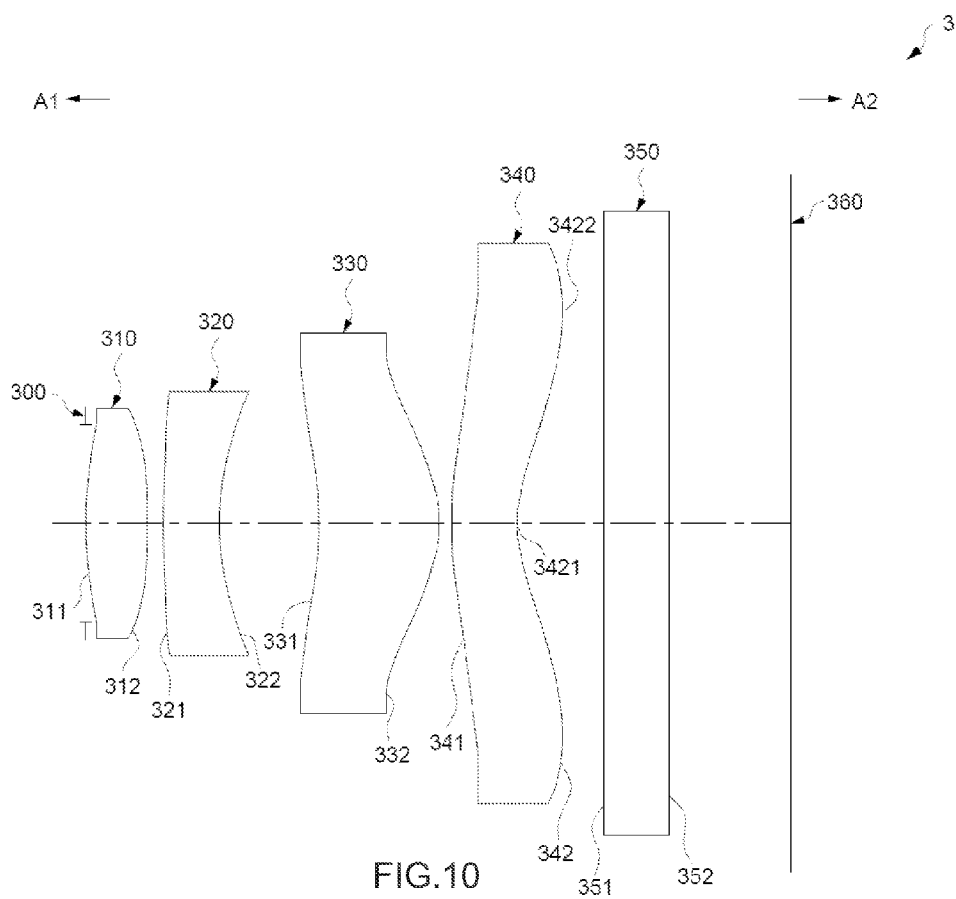
FIG. 10 is a cross-sectional view of a third embodiment of an optical imaging lens having four lens elements according to the present disclosure.
Figure 11:
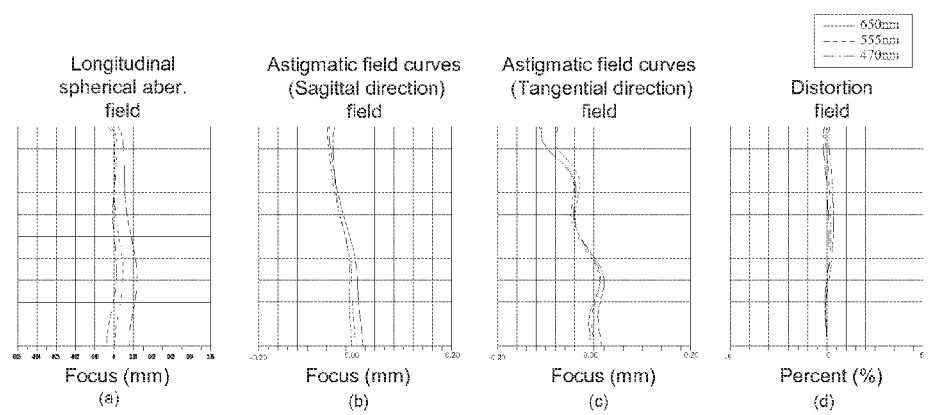
FIG. 11 is a chart of longitudinal spherical aberration and other kinds of optical aberrations of a third embodiment of the optical imaging lens according the present disclosure.

Reference is now made to FIGS. 10-13. FIG. 10 illustrates an example cross-sectional view of an optical imaging lens 3 having four lens elements according to a third example embodiment of the present invention. FIG. 11 shows example charts of longitudinal spherical aberration and other kinds of optical aberrations of the optical imaging lens 3 according to the third example embodiment. FIG. 12 depicts an example table of optical data of each lens element of the optical imaging lens 3 according to the third example embodiment. FIG. 13 depicts an example table of aspherical data of the optical imaging lens 3 according to the third example embodiment.

As shown in FIG. 10, the optical imaging lens 3 of the present embodiment, in an order from an object side A1 to an image side A2, comprises an aperture stop 300, a first lens element 310, a second lens element 320, a third lens element 330, and a fourth lens element 340. Each of the first, second, third, and fourth lens elements 310, 320, 330, 340 has a respective object-side surface 311, 321, 331, 341 facing toward the object side A1 and a respective image-side surface 312, 322, 332, 342 facing toward the image side A2.

The third embodiment is similar to the first embodiment. Please refer to FIG. 12 for the optical characteristics of each lens elements in the optical imaging lens 3 of the present embodiment, wherein the values of the equations (1)~(6) are:

$(T3/G_{34})$=9.200;

$(T4/T2)$=1.154;

$(G_{23}/T4)$=1.528;

$(G_{aa}/ALT)$=0.421;

$[(T1+T3)/T4]$=2.796;

$(EFL/ALT)$=1.594;

wherein the distance from the object side of the first lens element 310 to the image plane 360 is 3.24 mm, and the length of the optical imaging lens 3 is shortened.

As illustrated in FIG. 11, it is clear that the optical imaging lens 3 of the present embodiment may achieve great characteristics in longitudinal spherical aberration (a), astigmatism in the sagittal direction (b), astigmatism in the tangential direction (c), and distortion aberration (d). Therefore, according to above characteristics, the optical imaging lens of the present embodiment indeed achieves great optical performance, and the length of the optical imaging lens is effectively shortened.

Figure 14:
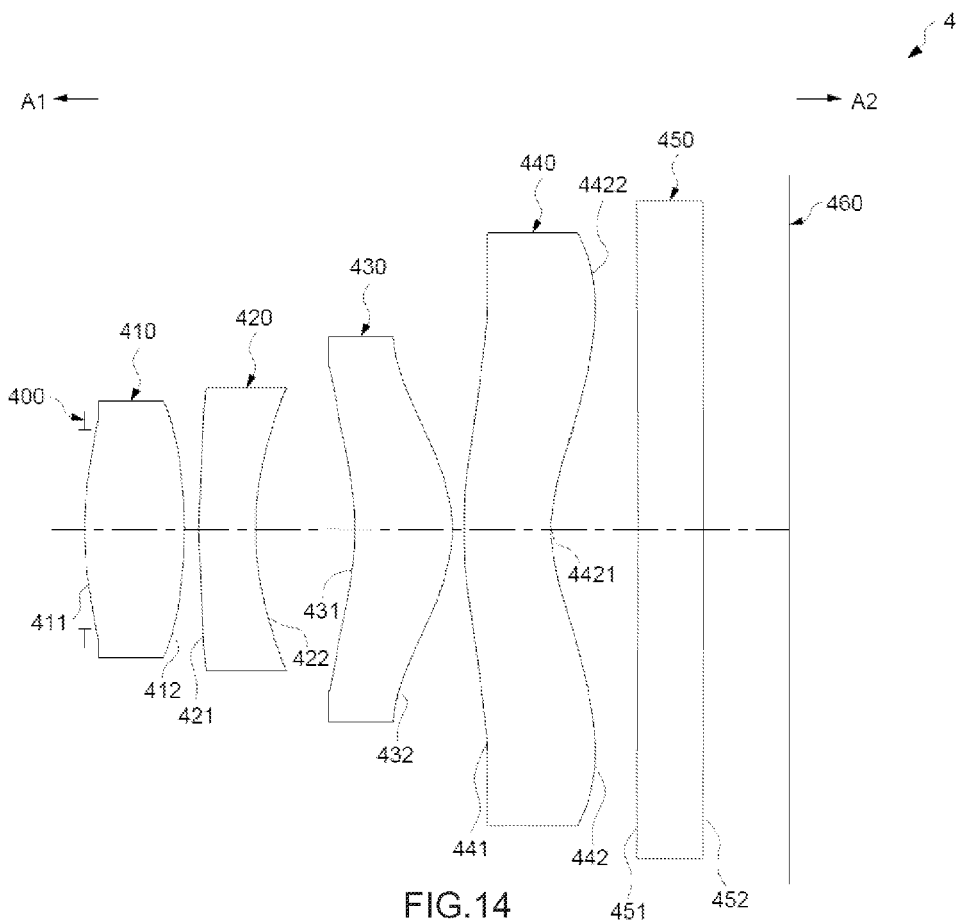
FIG. 14 is a cross-sectional view of a fourth embodiment of an optical imaging lens having four lens elements according to the present disclosure.
Figure 15:
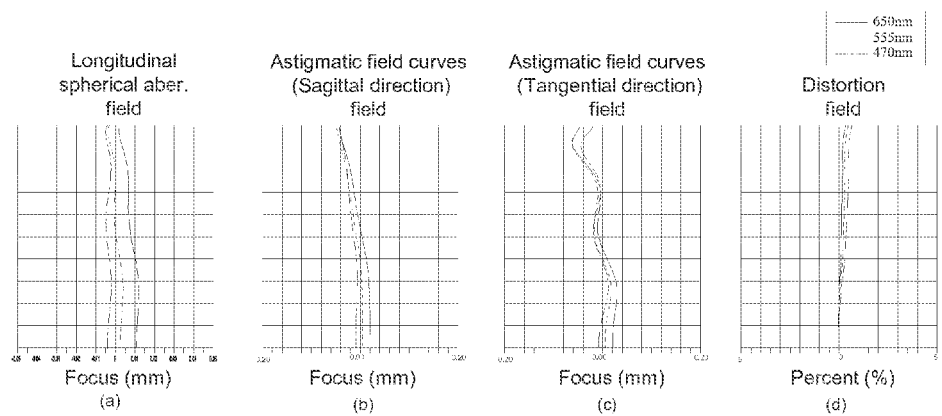
FIG. 15 is a chart of longitudinal spherical aberration and other kinds of optical aberrations of a fourth embodiment of the optical imaging lens according the present disclosure.

Reference is now made to FIGS. 14-17. FIG. 14 illustrates an example cross-sectional view of an optical imaging lens 4 having four lens elements according to a fourth example embodiment of the present invention. FIG. 15 shows example charts of longitudinal spherical aberration and other kinds of optical aberrations of the optical imaging lens 4 according to the fourth example embodiment. FIG. 16 shows an example table of optical data of each lens element of the optical imaging lens 4 according to the fourth example embodiment. FIG. 17 shows an example table of aspherical data of the optical imaging lens 4 according to the fourth example embodiment.

As shown in FIG. 14, the optical imaging lens 4 of the present embodiment, in an order from an object side A1 to an image side A2, comprises an aperture stop 400, a first lens element 410, a second lens element 420, a third lens element 430, and a fourth lens element 440. Each of the first, second, third, and fourth lens elements 410, 420, 430, 440 has a respective object-side surface 411, 421, 431, 441 facing toward the object side A1 and a respective image-side surface 412, 422, 432, 442 facing toward the image side A2.

The fourth embodiment is similar to the first embodiment. Please refer to FIG. 16 for the optical characteristics of each lens element in the optical imaging lens 4 of the present embodiment, wherein the values of the equations (1)~(6) are:

$(T3/G_{34})=7.469$;

$(T4/T2)=1.520$;

$(G_{23}/T4)=1.161$;

$(G_{aa}/ALT)=0.377$;

$[(T1+T3)/T4]=2.290$;

$(EFL/ALT)=1.602$;

wherein the distance from the object side of the first lens element 410 to the image plane 460 is 3.25 (mm), and the length of the optical imaging lens 4 is shortened.

As illustrated in FIG. 15, it is clear that the optical imaging lens 4 of the present embodiment may achieve great characteristics in longitudinal spherical aberration (a), astigmatism in the sagittal direction (b), astigmatism in the tangential direction (c), and distortion aberration (d). Therefore, according to above illustration, the optical imaging lens of the present embodiment indeed achieves great optical performance, and the length of the optical imaging lens is effectively shortened.

Figure 18:
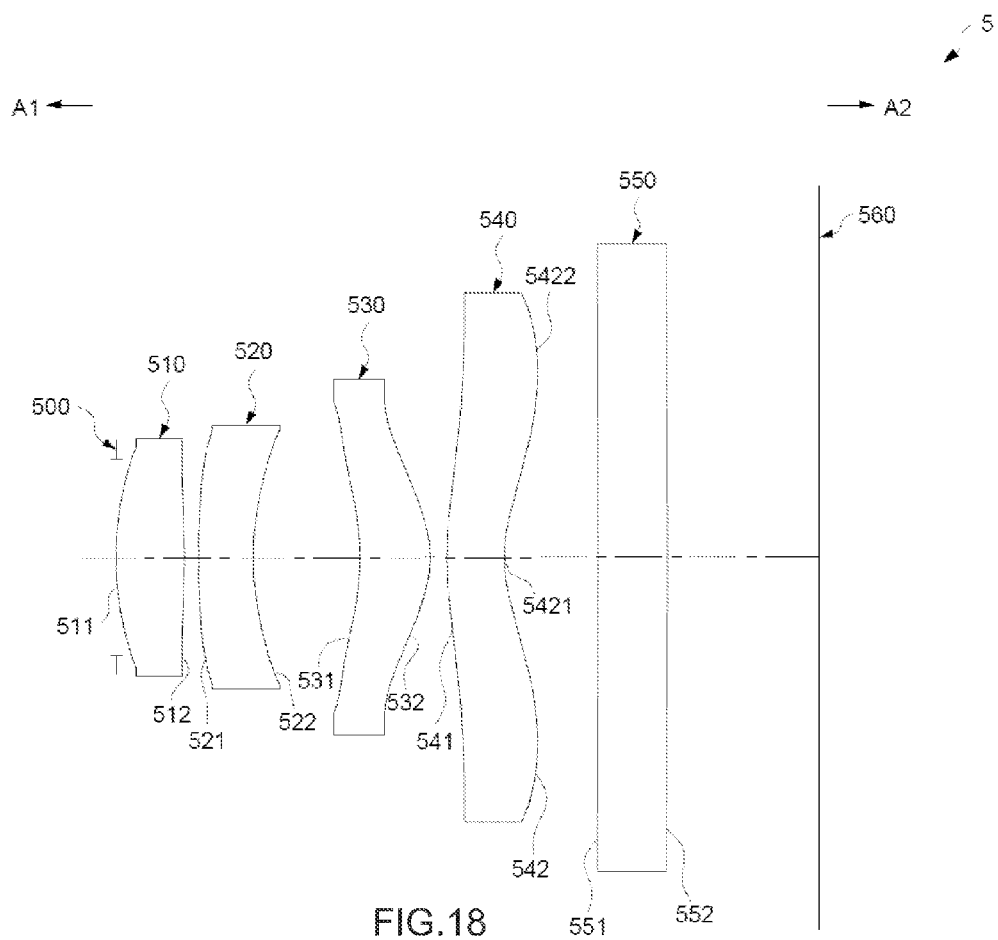
FIG. 18 is a cross-sectional view of a fifth embodiment of an optical imaging lens having four lens elements according to the present disclosure.
Figure 19:
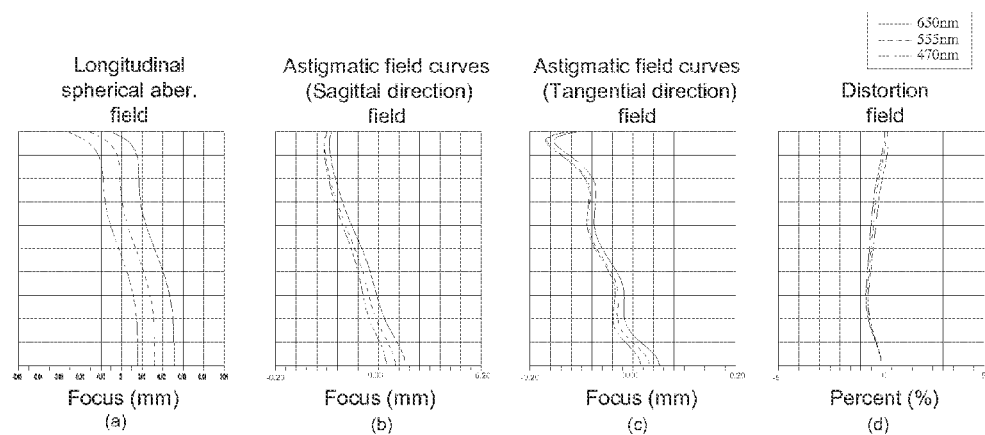
FIG. 19 is a chart of longitudinal spherical aberration and other kinds of optical aberrations of a fifth embodiment of the optical imaging lens according the present disclosure.

Reference is now made to FIGS. 18-21. FIG. 18 illustrates an example cross-sectional view of an optical imaging lens 5 having four lens elements according to a fifth embodiment of the present invention. FIG. 19 shows example charts of longitudinal spherical aberration and other kinds of optical aberrations of the optical imaging lens 5 according to the fifth example embodiment. FIG. 20 shows an example table of optical data of each lens element of the optical imaging lens 5 according to the fifth example embodiment. FIG. 21 shows an example table of aspherical data of the optical imaging lens 5 according to the fifth example embodiment.

As shown in FIG. 18, the optical imaging lens 5 of the present embodiment, in an order from an object side A1 to an image side A2, comprises an aperture stop 500, a first lens element 510, a second lens element 520, a third lens element 530, and a fourth lens element 540. Each of the first, second, third, and fourth lens elements 510, 520, 530, 540 have a respective object-side surface 511, 521, 531, 541 facing toward the object side A1 and a respective image-side surface 512, 522, 532, 542 facing toward the image side A2.

The fifth embodiment is similar to the first embodiment. Please refer to FIG. 20 for the optical characteristics of each lens elements in the optical imaging lens 5 of the present embodiment, wherein the values of the equations (1)~(6) are:

$(T3/G_{34})=4.229$;

$(T4/T2)=1.047$;

$(G_{23}/T4)=1.838$;

$(G_{aa}/ALT)=0.544$;

$[(T1+T3)/T4]=2.395$;

$(EFL/ALT)=2.350$;

wherein the distance from the object side of the first lens element 510 to the image plane 560 is 3.02 mm, and the length of the optical imaging lens 5 is shortened.

As illustrated in FIG. 19, it is clear that the optical imaging lens 5 of the present embodiment may show great characteristics in longitudinal spherical aberration (a), astigmatism in the sagittal direction (b), astigmatism in the tangential direction (c), or distortion aberration (d). Therefore, according to above illustration, the optical imaging lens of the present embodiment indeed achieves great optical performance, and the length of the optical imaging lens is effectively shortened.

Figure 22:
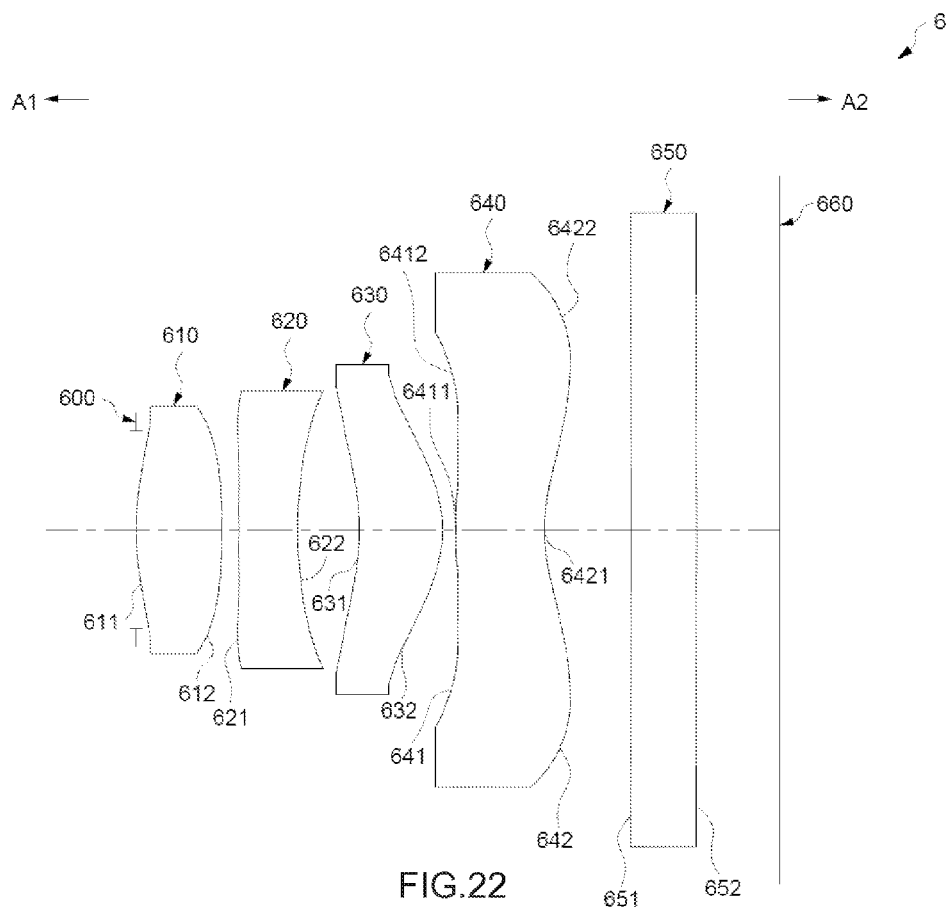
FIG. 22 is a cross-sectional view of a sixth embodiment of an optical imaging lens having four lens elements according to the present disclosure.
Figure 23:
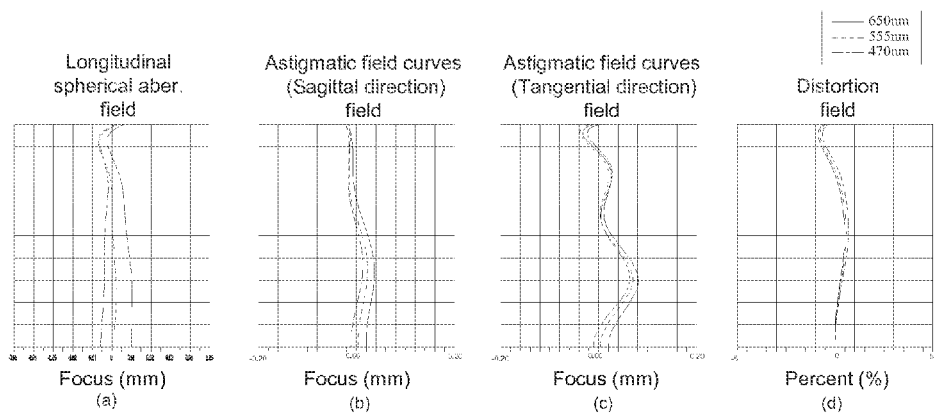
FIG. 23 is a chart of longitudinal spherical aberration and other kinds of optical aberrations of a sixth embodiment of the optical imaging lens according the present disclosure.

Reference is now made to FIGS. 22-25. FIG. 22 illustrates an example cross-sectional view of an optical imaging lens 6 having four lens elements according to a sixth example embodiment of the present invention. FIG. 23 shows example charts of longitudinal spherical aberration and other kinds of optical aberrations of the optical imaging lens 6 according to the sixth example embodiment. FIG. 24 shows an example table of optical data of each lens element of the optical imaging lens 6 according to the sixth example embodiment. FIG. 25 shows an example table of aspherical data of the optical imaging lens 6 according to the sixth example embodiment.

As shown in FIG. 22, the optical imaging lens 6 of the present embodiment, in an order from an object side A1 to an image side A2, comprises an aperture stop 600, a first lens element 610, a second lens element 620, a third lens element 630, and a fourth lens element 640. Each of the first, second, third, and fourth lens elements 610, 620, 630, 640 has an object-side surface 611/621/631/641 facing toward the object side A1 and an image-side surface 612/622/632/642 facing toward the image side A2.

The fourth lens element 640 comprise an image-side surface 641 which has a convex portion 6411 in a vicinity of the optical axis and a concave portion 6412 in a vicinity of a periphery of the fourth lens element 640. Please refer to FIG. 24 for the optical characteristics of each lens elements in the optical imaging lens 6 of the present embodiment, wherein the values of the equations (1)~(6) are:

$(T3/G_{34})=6.383$;

$(T4/T2)=1.509$;

$(G_{23}/T4)=0.699$;

$(G_{aa}/ALT)=0.290$;

$[(T1+T3)/T4]=1.897$;

$(EFL/ALT)=1.568$;

wherein the distance from the object side of the first lens element 610 to the image plane 660 is 2.96 mm, and the length of the optical imaging lens 6 is shortened.

As illustrated in FIG. 23, it is clear that the optical imaging lens 6 of the present embodiment may show great characteristics in longitudinal spherical aberration (a), astigmatism in the sagittal direction (b), astigmatism in the tangential direction (c), or distortion aberration (d). Therefore, according to above illustration, the optical imaging lens of the present embodiment indeed achieves great optical performance, and the length of the optical imaging lens is effectively shortened.

Please refer to FIG. 26, which shows the values of (T3/$G_{34}$), (T4/T2), ($G_{23}$/T4), ($G_{aa}$/ALT), [(T1+T3)/T4] and (EFL/ALT) of all six embodiments, and it is clear that the optical imaging lens of the present invention satisfy the Equations (1)~(6).

Reference is now made to FIG. 27, which illustrates an example structural view of a first embodiment of mobile device 20 applying an aforesaid optical imaging lens. The mobile device 20 comprises a housing 2100 and an optical imaging lens assembly 2200 disposed in the housing 210. An example of the mobile device 20 may be, but is not limited to, a mobile phone.

As shown in FIG. 27, the optical imaging lens assembly 2200 may comprise an aforesaid optical imaging lens, for example the optical imaging lens 1 of the first embodiment, a lens barrel 2300 for positioning the optical imaging lens 1, a module housing unit 2400 for positioning the lens barrel 230, and an image sensor 161 which is positioned at an image side of the optical imaging lens 1. The image plane 160 is formed on the image sensor 161.

In some example embodiments, the structure of the filtering unit 150 may be omitted. In some example embodiments, the housing 210, the lens barrel 2300, and/or the module housing unit 2400 may be integrated into a single component or assembled by multiple components. In some example embodiments, the image sensor 161 used in the present invention is directly attached to the substrate 162 in the form of a chip on board (COB) package, and such package is different from traditional chip scale packages (CSP) since a COB package does not require a cover glass before the image sensor 161 in the optical imaging lens 1.

Aforesaid exemplary embodiments are not limited to this package type and could be selectively incorporated in other described embodiments.

The module housing unit 2400 comprises a lens backseat 2401 and an image sensor base 2402 positioned between the lens backseat 2401 and the image sensor 161. The lens barrel 2300 and the lens backseat 2401 are disposed along a same axis, and the lens barrel 2300 is disposed inside the lens backseat 2401.

Because the length of the optical imaging lens 1 is merely 3.03 (mm), the size of the mobile device 20 may be quite small. Therefore, the embodiments described herein meet the market demand for smaller sized product designs.

Reference is now made to FIG. 28, which shows another structural view of a second embodiment of mobile device 22 applying the aforesaid optical imaging lens 1. One difference between the mobile device 22 and the mobile device 20 may be the module housing unit 2400 further comprising an autofocus module 2403. The autofocus module 2403 may comprise a lens seat 2404, a lens backseat 2401, a coil 2405, and a magnetic unit 2406. The lens seat 2404, which is close to the outside of the lens barrel 230, and the lens barrel 2300 are positioned along an axis II', and the lens backseat 2401 is positioned along with the axis II' and around the outside of the lens seat 2404. The coil 2405 is positioned between the lens seat 2404 and the inside of the lens backseat 2401. The magnetic unit 2406 is positioned between the outside of the coil 2405 and the inside of the lens backseat 2401.

The lens barrel 2300 and the optical imaging lens 1 disposed therein are driven by the lens seat 2404 for moving along the axis II'. The sensor backseat 2402 is close to the lens backseat 2401. The filtering unit 150, for example an IR cut filter, is disposed on the sensor backseat 2402. The rest structure of the mobile device 22 is similar to the mobile device 1.

Similarly, because the length 3.03 mm of the optical imaging lens 1 is shortened, the mobile device 22 may be designed with a smaller size while maintaining good optical performance. Therefore, the present invention meets the market demand for small-size products.

It can be seen from the above description, the thickness of a mobile device and the length of an optical imaging lens thereof in example embodiments can effectively be shortened through the control of ratios between at least one central thickness of lens element and an air gap along the optical axis between two lens elements, and through the control of a ratio between the sum of all air gaps along the optical axis between four lens elements and a central thickness of lens in a predetermined range.

While various embodiments in accordance with the disclosed principles have been described above, it should be understood that they have been presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

What is claimed is:

1. An optical imaging lens, sequentially from an object side to an image side, comprises:
    an aperture stop; and
    first, second, third and fourth lens elements, each of said first, second, third, and fourth lens elements having an object-side surface facing toward the object side and an image-side surface facing toward the image side, wherein:
    said first lens element has positive refracting power, said object-side surface thereof comprises a convex portion in a vicinity of the optical axis;
    said second lens element has negative refracting power, said object-side surface thereof is a convex surface, and said image-side surface thereof comprises a concave portion in a vicinity of the optical axis;
    said third lens element has positive refracting power;
    said object-side surface of said fourth lens element comprises a convex portion in a vicinity of the optical axis, and said image-side surface of said fourth lens element comprises a concave portion in a vicinity of the optical axis and a convex portion in a vicinity of a periphery of the fourth lens element;
    the optical imaging lens as a whole has refracting power,
    the sum of the thickness of all four lens elements along the optical axis is ALT, the sum of all three air gaps from the first lens element to the fourth lens element along the optical axis is $G_{aa}$, and ALT and $G_{aa}$ satisfy the relation:

$$0.26 \leq (G_{aa}/ALT) \leq 0.65; \text{ and}$$

a central thickness of the first lens element along the optical axis is T1, a central thickness of the third lens element along the optical axis is T3, a central thickness of the fourth lens element along the optical axis is T4, an air gap between the third lens element and the fourth lens element along the optical axis is $G_{34}$, and T1, T3, T4, and $G_{34}$ satisfy the relations:

$$1.8 \leq [(T1+T3)/T4] \leq 3 \text{ and } (T3/G_{34}) \leq 10.$$

2. The optical imaging lens according to claim 1, wherein an effective focal length is EFL, the sum of the thickness of all four lens elements along the optical axis is ALT, and EFL and ALT satisfy the equation:

$1.5 < (EFL/ALT)$.

3. The optical imaging lens according to claim 2, wherein T3, $G_{34}$, EFL, and ALT satisfy the equation:

$1.5 < (EFL/ALT) \leq 2.3$.

4. The optical imaging lens according to claim 3, wherein a central thickness of the second lens element along the optical axis is T2 and T2 and T4 satisfy the equation:

$(T4/T2) \leq 2$.

5. The optical imaging lens according to claim 2, wherein T3 and $G_{34}$ satisfy the equation:

$4 \leq (T3/G_{34}) \leq 10$.

6. The optical imaging lens according to claim 2, wherein an air gap between the second lens element and the third lens element along the optical axis is $G_{23}$, and T4 and $G_{23}$ satisfy the equation:

$(G_{23}/T4) \leq 2$.

7. The optical imaging lens according to claim 3, wherein T3 and $G_{34}$ further satisfy the equation:

$4 \leq (T3/G_{34}) \leq 10$.

8. The optical imaging lens according to claim 1, wherein a central thickness of the second lens element along the optical axis is T2 and T2 and T4 satisfy the equation:

$(T4/T2) \leq 2$.

9. The optical imaging lens according to claim 8, wherein an air gap between the second lens element and the third lens element along the optical axis is $G_{23}$, and T4 and $G_{23}$ satisfy the equation:

$(G_{23}/T4) \leq 2$.

10. A mobile device, comprising:
a housing; and
an optical imaging lens assembly positioned in the housing and comprising:
a lens barrel;
the optical imaging lens as claimed in claim 1, positioned in the barrel;
a module housing unit for positioning the lens barrel; and
an image sensor positioned at the image side of the optical imaging lens.

11. The mobile device according to claim 10, wherein the module housing unit further comprises an auto focus module comprising a lens seat and a lens backseat, the lens seat is positioned close to the outside of the lens barrel and along with an axis, the lens backseat is positioned along the axis and around the outside of the lens seat, and the lens barrel and the optical imaging lens positioned therein are driven by the lens seat for moving along the axis to control the focusing of the optical imaging lens.

12. The mobile device according to claim 11, wherein the module housing unit further comprises an image sensor base positioned between the lens backseat and the image sensor, and the image sensor base is closed to the lens backseat.

* * * * *